US009542105B2

(12) United States Patent
Goodman et al.

(10) Patent No.: US 9,542,105 B2
(45) Date of Patent: *Jan. 10, 2017

(54) COPYING VOLUMES BETWEEN STORAGE POOLS

(71) Applicant: INTERNATIONAL BUSINESS MACHINES CORPORATION, Armonk, NY (US)

(72) Inventors: Daniel I. Goodman, Beit Shemesh (IL); Rivka M. Matosevich, Zicron-Ya'acov (IL); Orit Nissan-Messing, Hod HaSharon (IL); Eyal Perek, Petach-Tikva (IL); Amichai Schreiber, Modin (IL); Eliyahu Weissbrem, Rehovot (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/018,290

(22) Filed: Feb. 8, 2016

(65) Prior Publication Data

US 2016/0154592 A1    Jun. 2, 2016

Related U.S. Application Data

(63) Continuation of application No. 14/078,099, filed on Nov. 12, 2013, now Pat. No. 9,323,764.

(51) Int. Cl.
*G06F 17/30* (2006.01)
*G06F 3/06* (2006.01)

(52) U.S. Cl.
CPC ............ *G06F 3/0617* (2013.01); *G06F 3/065* (2013.01); *G06F 3/0644* (2013.01);
(Continued)

(58) Field of Classification Search
CPC ............ G06F 11/1469; G06F 17/30091; G06F 17/30162; G06F 3/0643; G06F 3/0644; G06F 2201/84; G06F 3/065; G06F 11/2082; Y10S 707/99955
(Continued)

(56) References Cited

U.S. PATENT DOCUMENTS 6,131,148 A * 10/2000 West .................. G06F 11/1446
707/999.202
6,253,295 B1    6/2001 Beal et al.
(Continued)

OTHER PUBLICATIONS

Bellare et al., "Introduction to Modern Cryptography Course Notes, Chapter 6 Hash Functions," University of San Diego, https://cseweb.ucsd.edu/~mihir/cse207.w-hash.pdf (15 pages).
(Continued)

*Primary Examiner* — Thanh-Ha Dang
(74) *Attorney, Agent, or Firm* — Griffiths & Seaton PLLC

(57) ABSTRACT

Methods, apparatus and computer program products implement embodiments of the present invention that include defining a source data volume including a first multiple of source snapshots, and storing the first multiple of the source snapshots in a first storage pool including a second multiple of storage regions having respective identifiers. Upon receiving a request to copy the source data volume to a target data volume in a second storage pool, a first given source snapshot including a first set of the storage regions is accessed, and a second given source snapshot preceding the first given source snapshot is identified, the second given source snapshot including a second set of the storage regions. A set difference of the second and the first sets of the storage regions is identified, and respective identifiers of the set difference are stored to the target volume.

20 Claims, 6 Drawing Sheets

(52) U.S. Cl.
CPC ...... *G06F 3/0683* (2013.01); *G06F 17/30091* (2013.01); *G06F 3/0643* (2013.01); *G06F 17/30162* (2013.01)

(58) Field of Classification Search
USPC ........................................................ 707/639
See application file for complete search history.

(56) References Cited

U.S. PATENT DOCUMENTS

| | | |
|---|---|---|
| 6,446,176 B1 | 9/2002 | West et al. |
| 7,065,616 B2 | 6/2006 | Gajjar et al. |
| 7,089,381 B2 | 8/2006 | Horn et al. |
| 7,181,477 B2 | 2/2007 | Saika et al. |
| 7,376,786 B2 | 5/2008 | Williams |
| 7,657,613 B1 | 2/2010 | Hanson et al. |
| 7,797,468 B2 | 9/2010 | Shin et al. |
| 7,945,640 B1 | 5/2011 | Vantine |
| 8,341,119 B1 | 12/2012 | Roussos et al. |
| 8,402,118 B2 | 3/2013 | Finnegan et al. |
| 8,478,845 B2 | 7/2013 | Agarwala et al. |
| 8,914,327 B2 | 12/2014 | Hornkvist |
| 2004/0205300 A1 | 10/2004 | Bearden |
| 2004/0250033 A1 | 12/2004 | Prahlad et al. |
| 2005/0010731 A1 | 1/2005 | Zalewski et al. |
| 2005/0138312 A1* | 6/2005 | Kubo ................ G06F 11/1466 711/162 |
| 2007/0011137 A1 | 1/2007 | Kodama |
| 2007/0106709 A1* | 5/2007 | Augenstein ........ G06F 11/1456 |
| 2007/0174669 A1* | 7/2007 | Ebata ................ G06F 11/1469 714/6.1 |
| 2007/0233868 A1 | 10/2007 | Tyrrell et al. |
| 2008/0034176 A1* | 2/2008 | Akutsu .............. G06F 11/2058 711/162 |
| 2008/0313414 A1 | 12/2008 | Shackelford |
| 2009/0094500 A1 | 4/2009 | Swekel |
| 2009/0240880 A1 | 9/2009 | Kawaguchi |
| 2010/0138605 A1 | 6/2010 | Kazar et al. |
| 2010/0306467 A1 | 12/2010 | Pruthi et al. |
| 2010/0332748 A1* | 12/2010 | van der Goot ...... G06F 3/0613 711/114 |
| 2011/0022642 A1 | 1/2011 | Demilo et al. |
| 2011/0131443 A1 | 6/2011 | Laor et al. |
| 2011/0191536 A1* | 8/2011 | Mizuno ................ G06F 3/0611 711/114 |
| 2011/0208940 A1* | 8/2011 | Naganuma ........... G06F 3/0604 711/170 |
| 2011/0252280 A1 | 10/2011 | Finnegan et al. |
| 2011/0258404 A1 | 10/2011 | Arakawa et al. |
| 2012/0059976 A1 | 3/2012 | Rosenband et al. |
| 2012/0096231 A1* | 4/2012 | Morishita ............ G06F 3/0608 711/162 |
| 2012/0198073 A1 | 8/2012 | Srikanth et al. |
| 2012/0198190 A1 | 8/2012 | Hart et al. |
| 2012/0210087 A1 | 8/2012 | Sugimoto et al. |
| 2012/0246642 A1 | 9/2012 | Pafumi et al. |
| 2012/0284239 A1* | 11/2012 | Agarwala ............ G06F 3/0608 707/693 |
| 2012/0331251 A1* | 12/2012 | Schnapp ............. G06F 3/0605 711/162 |
| 2013/0007388 A1* | 1/2013 | Kito .................... G06F 3/0608 711/162 |
| 2013/0036280 A1* | 2/2013 | Futawatari ............. G06F 3/061 711/162 |
| 2013/0054520 A1 | 2/2013 | Sampathkumar |
| 2013/0067164 A1 | 3/2013 | Velayudhan et al. |
| 2013/0067188 A1* | 3/2013 | Mehra .................. G06F 3/0605 711/170 |
| 2013/0067464 A1* | 3/2013 | Shah ..................... G06F 9/5077 718/1 |
| 2013/0111471 A1 | 5/2013 | Chandrasekaran |
| 2013/0117448 A1 | 5/2013 | Nahum et al. |
| 2013/0227552 A1 | 8/2013 | Reddin et al. |
| 2013/0246365 A1 | 9/2013 | Hornkvist |
| 2013/0246922 A1 | 9/2013 | Doerr et al. |
| 2013/0297899 A1* | 11/2013 | Kawaguchi .......... G06F 3/0613 711/162 |
| 2013/0311612 A1* | 11/2013 | Dickinson ............ G06F 17/301 709/219 |
| 2013/0325824 A1 | 12/2013 | Shoens |
| 2013/0339643 A1* | 12/2013 | Tekade ............. G06F 17/30581 711/162 |
| 2013/0339647 A1 | 12/2013 | Jindo et al. |
| 2014/0040580 A1* | 2/2014 | Kripalani ................ G06F 3/065 711/162 |
| 2014/0068211 A1 | 3/2014 | Fiske et al. |
| 2014/0156956 A1 | 6/2014 | Ezra |
| 2015/0026141 A1 | 1/2015 | Blanco et al. |

OTHER PUBLICATIONS

Anonymous, "A System and Method for Providing Meta-data Model Based Distributed Data," An IP.com Prior Art Database Technical Disclosure, IPCOM000214707D, Feb. 3, 2012 (8 pages).
Anonymous, "Method and System for Extracting Meta-data for Interactions over Collaborative Applications," An IP.com Prior Art Database Technical Disclosure, IPCOM000199131D, Aug. 26, 2010 (2 pages).
Kang et al., "Virtual Allocation: A Scheme for Flexible Storage Allocation," Proceedings of the OASIS workshop in conjunction with ASPLOS, Association for Computing Machinery, Washington DC, Texas A&M University, Boston, MA, Oct. 13, 2004 (6 pages).
Papazoglou et al., "Blueprinting the cloud," IEEE 15.6, Internet Computing, 2011 (6 pages).

\* cited by examiner

COPYING VOLUMES BETWEEN STORAGE POOLS

CROSS-REFERENCE TO RELATED APPLICATIONS

This application is a Continuation of U.S. patent application Ser. No. 14/078,099, filed on Nov. 12, 2013, the contents of which are incorporated herein by reference.

FIELD OF THE INVENTION

The present invention relates generally to data storage, and specifically to copying a volume from a source storage pool to a target storage pool by copying a difference of the volumes as a metadata operation.

BACKGROUND

In computer storage arrays (also referred to herein as storage systems or storage subsystems), disk partitioning and data volume management are used to manage physical storage devices such as hard disk drives. In disk partitioning, a single storage device is divided into multiple logical storage regions referred to as partitions, thereby treating one physical storage device as if it were multiple disks. Data volume management provides a method of allocating space on mass-storage devices that is more flexible than conventional partitioning schemes. In particular, a volume manager can concatenate, stripe together or otherwise combine regions (a region is a sequence of bytes having a specific length, typically one megabyte) into larger virtual regions that administrators can re-size or move, potentially without interrupting system use.

Storage facilities can use snapshots for disaster recovery planning. A snapshot may be a copy of data residing on a data volume that is created at a particular point in time. Since a full backup of a large data set can take a long time to complete, a snapshot may define the dataset to be backed up. Data associated with the snapshot is static, and is therefore protected from any subsequent changes to the data on the data volume (e.g., a database update).

One typical implementation of a snapshot is called a "pointer snapshot." A pointer snapshot records an index of data locations to be protected on the data volume. Pointer snapshots can be created fairly quickly and require far less storage space than is required to maintain a separate copy of the snapshot data.

The description above is presented as a general overview of related art in this field and should not be construed as an admission that any of the information it contains constitutes prior art against the present patent application.

SUMMARY

There is provided, in accordance with an embodiment of the present invention a method, including defining a source data volume including a first multiple of source snapshots, storing the first multiple of the source snapshots in a first storage pool including a second multiple of storage regions having respective identifiers, receiving a request to copy the source data volume to a target data volume in a second storage pool, accessing a first given source snapshot including a first set of the storage regions, identifying, by a module processor, a second given source snapshot preceding the first given source snapshot, the second given source snapshot including a second set of the storage regions, identifying a set difference of the second set and the first set of the storage regions, and storing respective identifiers of the set difference to the target volume.

There is also provided, in accordance with an embodiment of the present invention a storage system, including a storage device including a first multiple of storage regions having respective identifiers, and a module processor configured to define a source data volume including a second multiple of source snapshots, to store the second multiple of the source snapshots in a first storage pool including a third multiple of the storage regions, to receive a request to copy the source data volume to a target data volume in a second storage pool, to access a first given source snapshot including a first set of the storage regions, to identify a second given source snapshot preceding the first given source snapshot, the second given source snapshot including a second set of the storage regions, to identify a set difference of the second set and the first set of the storage regions, to store the respective identifiers of the set difference to the target volume, and to create a target snapshot in the second storage pool.

There is further provided, in accordance with an embodiment of the present invention a computer program product, the computer program product including a non-transitory computer readable storage medium having computer readable program code embodied therewith, the computer readable program code including computer readable program code configured to define a source data volume including a first multiple of source snapshots, computer readable program code configured to store the first multiple of the source snapshots in a first storage pool including a second multiple of storage regions having respective identifiers, computer readable program code configured to receive a request to copy the source data volume to a target data volume in a second storage pool, computer readable program code configured to access a first given source snapshot including a first set of the storage regions, computer readable program code configured to identify a second given source snapshot preceding the first given source snapshot, the second given source snapshot including a second set of the storage regions, computer readable program code configured to identify a set difference of the second set and the first set of the storage regions, computer readable program code configured to store the respective identifiers of the set difference to the target volume, and computer readable program code configured to create a target snapshot in the second storage pool.

BRIEF DESCRIPTION OF THE DRAWINGS

The disclosure is herein described, by way of example only, with reference to the accompanying drawings, wherein.

DETAILED DESCRIPTION OF EMBODIMENTS

Storage systems may comprise multiple storage pools, wherein each of the storage pools comprises a distinct set of storage regions (also known as blocks and partitions) on the storage system. In operation the storage region can define given data volumes in each of the storage pools.

Embodiments of the present invention provide methods and systems for copying a source data volume comprising multiple snapshots from a first given storage pool to target data volume in a second given storage pool. In some embodiments, upon identifying snapshots for the volume, metadata for the least recent snapshot can be stored to the data volume, and a first target snapshot can then be created for the target data volume. As described hereinbelow, the metadata may comprise identifiers of storage regions used to store least recent snapshot in the first given storage pool.

For each given snapshot that was created subsequent to the least recent snapshot, a preceding snapshot to the given snapshot can be identified, metadata indicating a difference between the given and the preceding snapshots can be stored to the target data volume, and an additional target snapshot can then be created for the target data volume in the second given storage pool.

Systems implementing embodiments of the present invention can perform a metadata operation that creates a reference to the storage regions on the original volume or snapshot, thereby enabling a data volume copy operation to be completed in a short period of time, instead of becoming an asynchronous operation that may need to be monitored until completion. Additionally, embodiments of the present invention can further enhance the space efficiency of the resulting set of volume and its snapshots.

Figure 1:
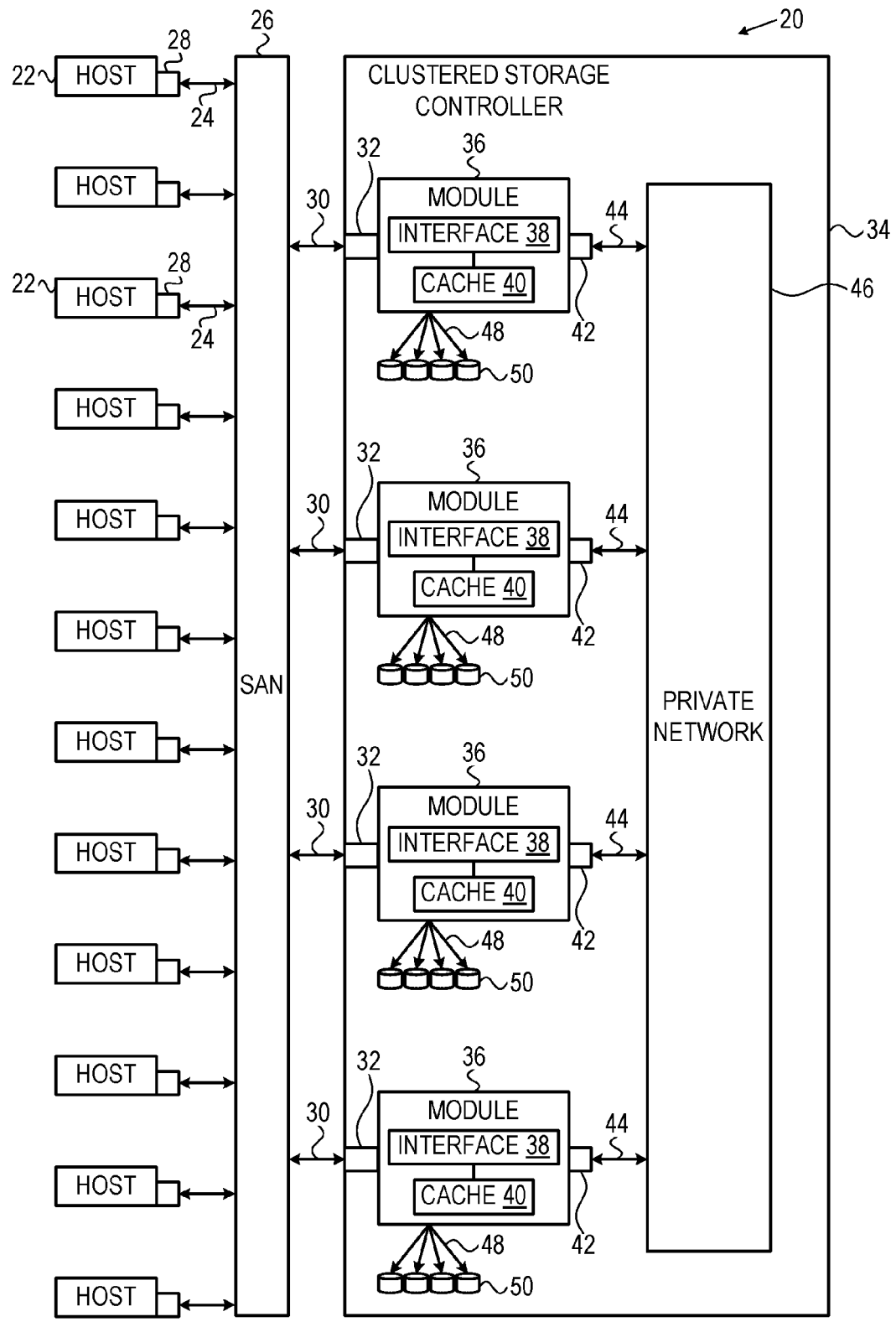
FIG. 1 is a block diagram that schematically illustrates a storage system, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on data volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a data volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a data volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, each of the logical storage devices may be referred to as a logical unit, and when made accessible by a given host computer 22, a logical unit number (LUN). While each LUN can be addressed as a single logical unit, the LUN may comprise a combination of high capacity hard disk drives and/or solid state disk drives.

Figure 2:
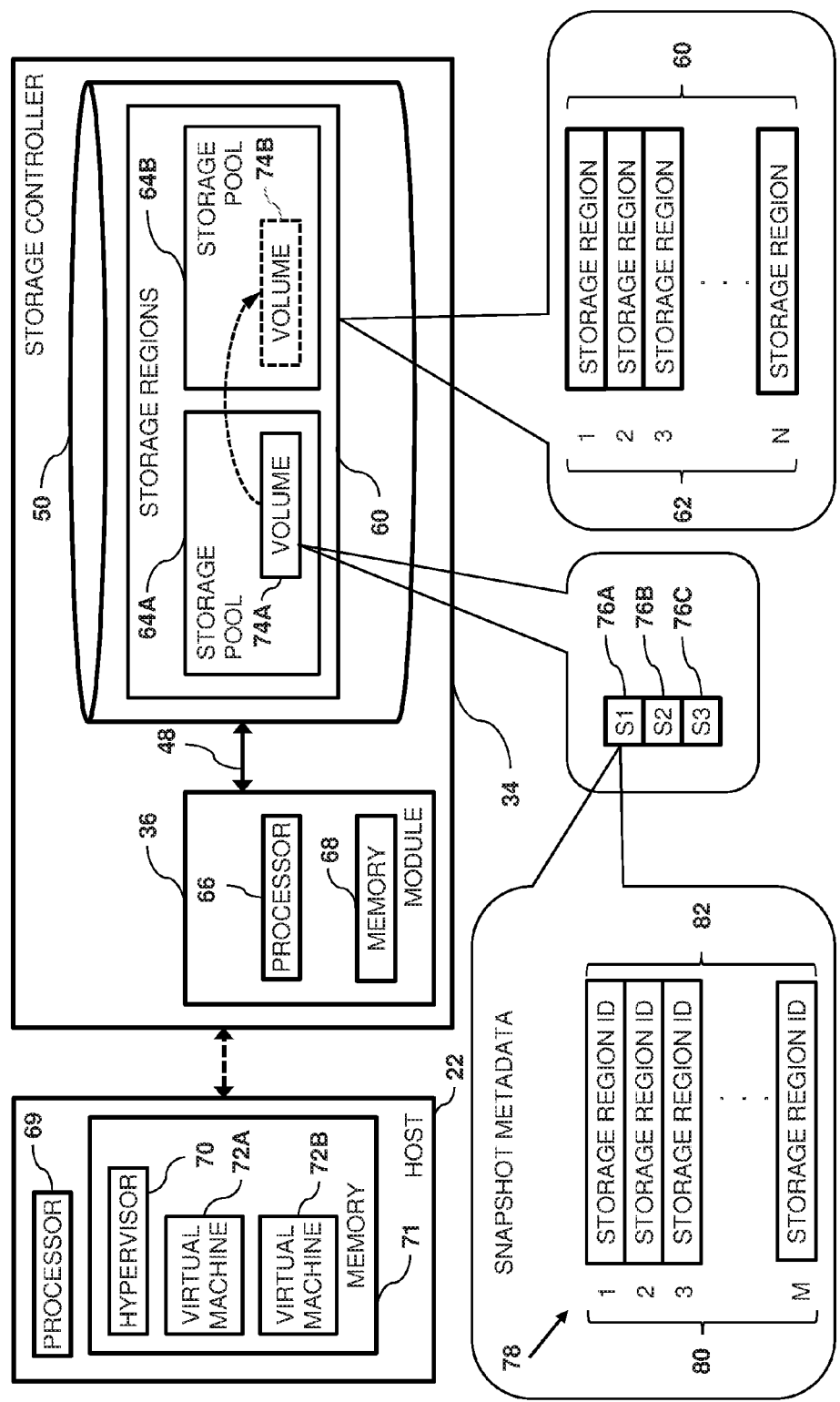
FIG. 2 is a block diagram of a module of the storage system configured to copy a data volume from a first storage pool to a second storage pool, in accordance with an embodiment of the present invention.

FIG. 2 is a block diagram of a given module 36, in accordance with a first embodiment of the present invention. In embodiments described herein, storage device 50 comprises N storage regions 60 (also referred to herein as blocks or data blocks), wherein each of the storage regions has a respective identifier 62 and comprises a sequence of bytes having a fixed size. In the configuration shown in FIG. 2, storage regions 60 are distributed among storage pools 64 that can be differentiated by appending a letter to the identifying numeral, so that the storage pools comprise storage pools 64A and 64B. In embodiments described herein storage pool 64A may also be referred to as a first storage pool and storage pool 64B may also be referred to as a second storage pool.

Each module 36 comprises a module processor 66 and a module memory 68, and each host computer 22 comprises a host processor 69 and a host memory 71. In some embodiments, a given host computer's processor 69 may execute a hypervisor 70 from memory 71, thereby creating multiple virtual machines 72 in memory 71. Examples of a hypervisor 70 include, but are not limited to, ESX™ or ESXi™, which are produced by VMware Inc., Palo Alto Calif. In the configuration shown in FIG. 2, virtual machines 72 can be differentiated by appending a letter to the identifying numeral, so that the virtual machines comprise virtual machines 72A and 72B. In operation, a given virtual machine 72 can be assigned to a given storage pool 64 so that the given virtual machine can access the storage regions in the given storage pool.

In embodiments of the present invention processor 66 can transfer a data volume 74 comprising snapshots 76 from storage pool 64A to storage pool 64B. In the configuration shown in FIG. 2, data volumes 74 can be differentiated by appending a letter to the identifying numeral, so that the data volumes comprises a source volume 74A in storage pool 64A and a target data volume 74B in data pool 64B. Snapshots 76 can be differentiated by appending a letter to the identifying numeral, so that the snapshots comprise snapshots 76A, 76B and 76C (shown in the Figure as S1, S2 and S3). In embodiments herein, snapshots 76 stored in storage pool 64A may also be referred to as source snapshots and snapshots 76 stored in storage pool 64B may also be referred to as target snapshots. As described hereinbelow, processor 66 can transfer data volume 74A from storage pool 64A to storage pool 64B by storing metadata 78 of snapshots 76 to the second storage pool.

For each given snapshot 76, metadata 78 comprises M logical block number 80, wherein each of the logical block numbers has a corresponding storage region identifier 82 that references a specific storage region 60. In some embodiments, metadata 78 may also comprise additional information (not shown) such as:

Creation dates for the volume and each of the snapshots.

A lock status for the volume. For example the volume can be locked for write operations, read operations or both.

The volume's logical and physical sizes.

Processors 66 and 69 typically comprise general-purpose computers, which are programmed in software to carry out the functions described herein. The software may be downloaded to modules 36 and host computer 22 in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Transferring Volumes Between Storage Pools

Figure 3A:
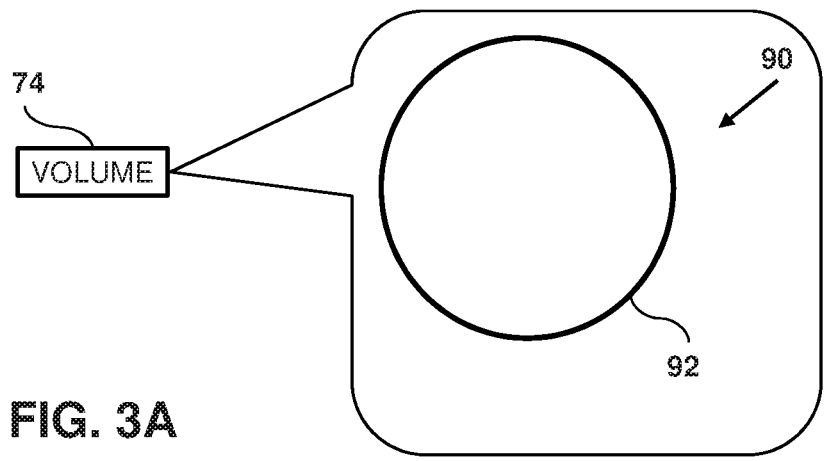
FIGS. 3A-3C are a first set of Venn diagrams that illustrate storage regions of the storage system allocated to multiple snapshots of the data volume, in accordance with an embodiment of the present invention.
Figure 3B:
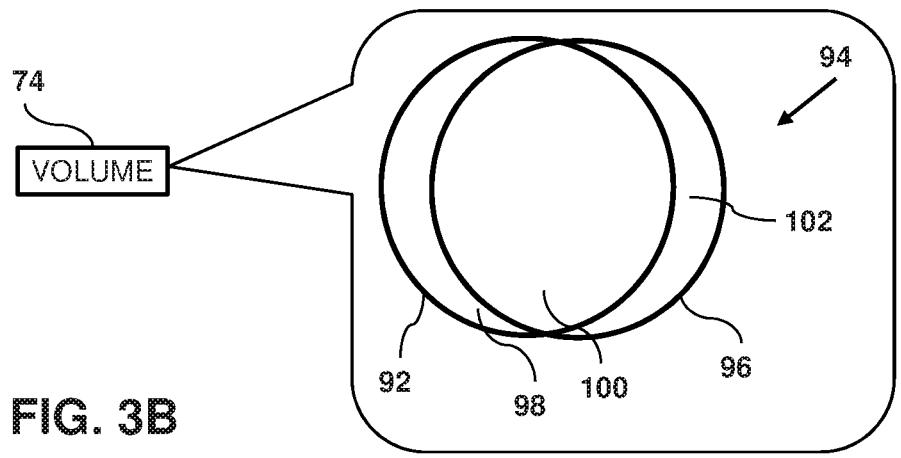
Figure 3C:
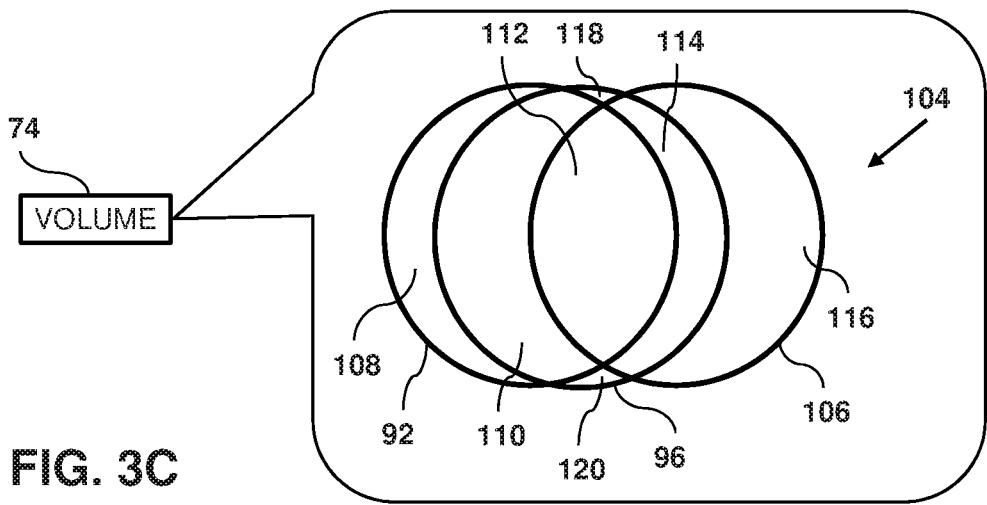

FIGS. 3A-3C are Venn diagrams that show snapshots 76 comprising storage regions 60, in accordance with an embodiment of the present invention. As shown in FIG. 2, data volume 74A comprises snapshots 76A, 76B and 76C. While embodiments described herein describe data volume 74A comprising three snapshots 76, a given data volume 74A comprising any plurality of snapshots 76 is considered to be within the spirit and scope of the present invention.

FIG. 3A is a Venn diagram 90 that shows a set 92 comprising storage regions 60 of snapshot 76A. FIG. 3B is a Venn diagram 94 that shows set 92 and a set 96 comprising storage regions 60 of snapshot 76B. FIG. 3B also comprises:

A subset 98 comprising a relative complement of set 96 with respect to set 92 (i.e., storage regions 60 that are included in snapshot 76A but are not included in snapshot 76B).

A subset 100 comprising an intersection between sets 92 and 96 (i.e., storage regions 60 that are included in both snapshots 76A and 76B).

A subset 102 comprising a relative complement of set 92 with respect to set 96 (i.e., storage regions 60 that are included in snapshot 76B but are not included in snapshot 76A).

FIG. 3C is a Venn diagram 104 that shows set 92, set 96 and a set 106 comprising storage regions 60 of snapshot 76C. FIG. 3C also comprises:

A subset 108 comprising a relative complement of sets 96 and 106 with respect to set 92 (i.e., storage regions 60 that are included in snapshot 76A but are not included in snapshots 76B and 76C).

A subset 110 comprising a relative complement of set 106 with respect to an intersection of sets 92 and 96 (i.e., storage regions 60 that are included in both snapshots 76A and 76B but are not included in snapshot 76C).

A subset 112 comprising an intersection of sets 92, 96 and 106 (i.e., storage regions 60 that are included in snapshots 76A, 76B and 76B).

A subset 114 comprising relative complement of set 92 with respect to an intersection of sets 96 and 106 (i.e., storage regions 60 that are included in snapshots 76B and 76C, and not included in snapshot 76A).

A subset 116 comprising a relative complement of sets 92 and 96 with respect to set 106 (i.e., storage regions 60 that are included in snapshot 76C but are not included in snapshots 76A and 76B).

Subsets 118 and 120 comprising a relative complement of sets 92 and 106 with respect to set 96 (i.e., storage regions 60 that are included in snapshot 76B but are not included in snapshots 76A and 76C).

Figure 4:
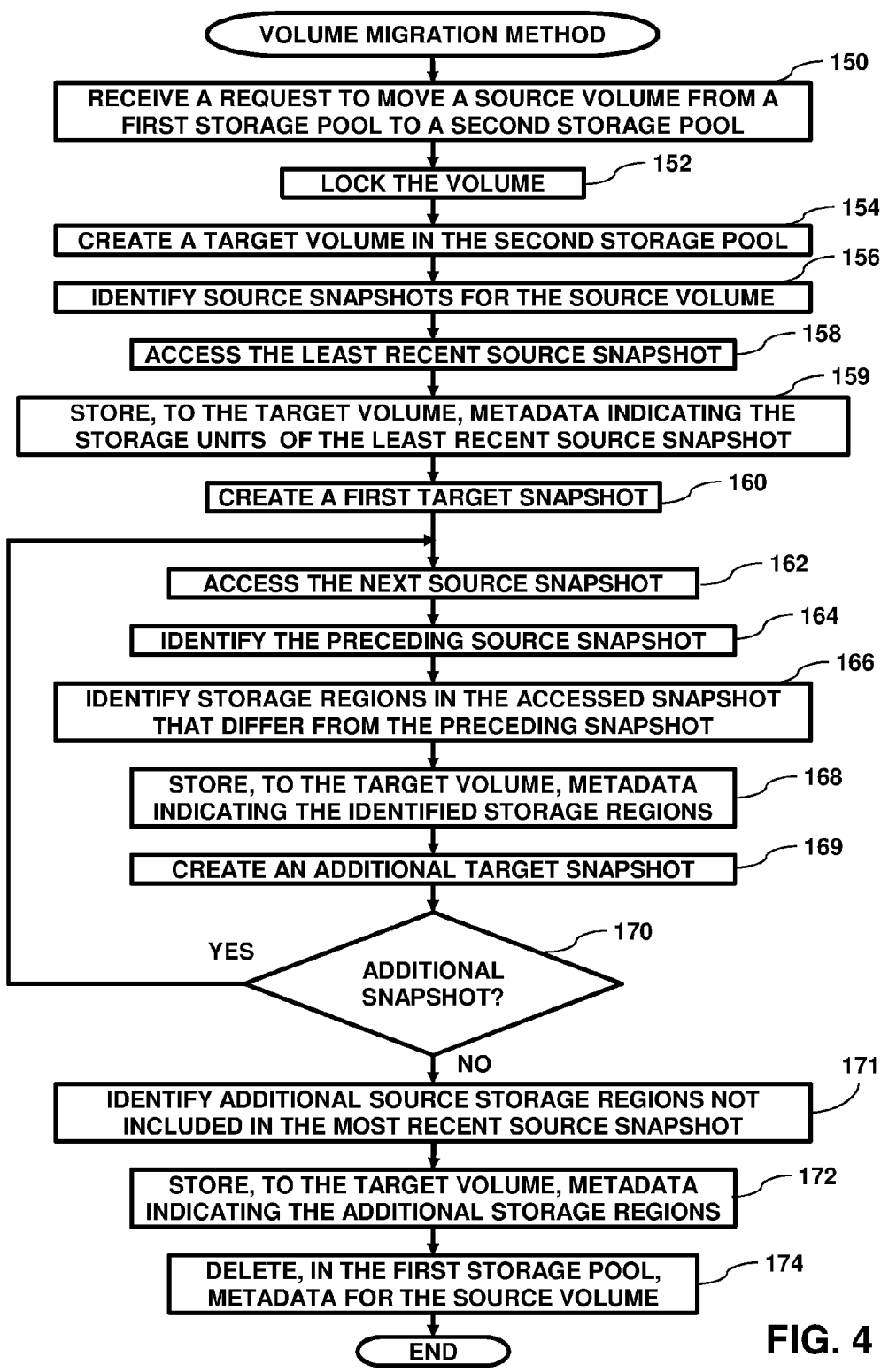
FIG. 4 is a flow diagram that schematically illustrates a method of copying the data volume from the first storage pool to the second storage pool, in accordance with an embodiment of the present invention.

FIG. 4 is a flow diagram that schematically illustrates a method of moving data volume 74A from storage pool 64A to storage pool 64B. Prior to executing the steps in the flow diagram, processor 66 defines data volume 74A comprising a first multiple of snapshots 76, and stores the first multiple of the snapshots to storage pool 64A. In embodiments described herein, storage pool 64A comprises a second multiple of storage regions 60.

Figure 5A:
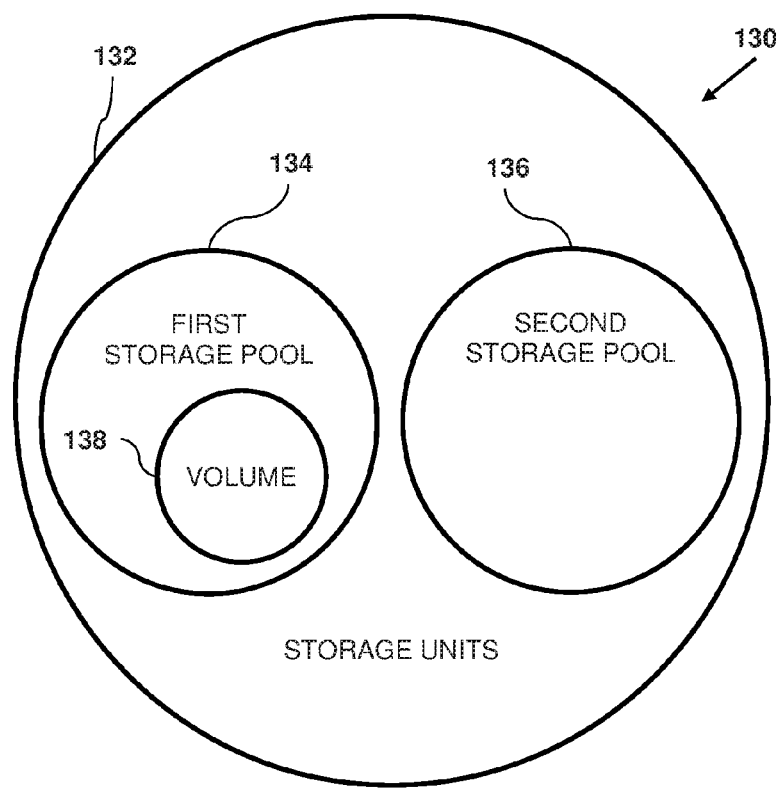
FIGS. 5A-5C are a second set of Venn diagrams that illustrate allocation of the data volume's storage regions to the first and the second storage pools while copying the data volume, in accordance with an embodiment of the present invention.

FIG. 5A shows a Venn diagram 130 that shows a set 132 comprising the storage regions 60 in storage controller 34, upon defining data volume 74A. Set 132 comprises a subset 134 comprising a first subset of storage regions 60 in storage pool 64A, a subset 136 comprising a second subset of the storage regions in the first storage pool, and a subset 138 comprising the storage regions used to store data volume 74A. In Venn diagram 130, subset 138 comprises a subset of subset 134. In other words, data volume 74A comprises storage regions 60 presently allocated to the first storage region.

In embodiments where processor 69 executes hypervisor 70 to define virtual machines 72A and 72B, processor 66 can assign storage pool 64A to virtual machine 72A, and assign storage pool 64B to virtual machine 72B.

In a receive step 150 in the flow diagram, processor 66 receives a request to move source data volume 74A from storage pool 64A to target data volume 74B in storage pool 64B. In some embodiments, processor 66 can receive the request from a console (not shown) coupled to storage controller 34 and operated by a system administrator. In additional embodiments, storage pool 64A and storage pool 64B comprise a single (i.e., identical) storage pool 64.

In a lock step 152, processor 66 locks data volume 74A, and in a first create step 154, the module processor creates target data volume 74B in storage pool 64B. Upon completing step 154, target data volume 74B is defined in storage pool 64B, but is empty (i.e., does not store any data).

In a first identification step 156, processor 66 identifies source snapshots 76A, 76B and 76C that comprise the snapshots for source data volume 74A, and in a first access step 158, the module processor accesses a least recent one of the identified source snapshot (i.e., snapshot 76A).

In a first store step 159, processor 66 stores, to the target volume, metadata 78 for snapshot 76A, and in a first create step 160, the module processor creates, in storage pool 64B, a first target snapshot 76. In some embodiments, the metadata comprises storage region identifiers 82 that indicate identifiers 62 of the respective storage regions storing source snapshot 76A (i.e., the least recent snapshot). In alternative embodiments, the metadata can indicate identifiers 62 of the respective storage regions that are referenced in a current state of the source volume or any subsequent source snapshots 76.

In other words, upon completing step 160, snapshot 76A has a first instance in storage pool 64A and a second instance in storage pool 64B. In the example shown in FIG. 2, metadata 78 comprises logical block numbers 80 and respective storage region identifiers 82 for the storage regions storing source snapshot 76A.

In a second access step 162, processor 66 accesses the next source snapshot 76 from the snapshots identified in step 156, and in a second identification step 164 the module processor identifies, in storage pool 64A, a given source snapshot 76 that precedes the accessed source snapshot. The given source snapshot may also be referred to herein as the preceding source snapshot. For example when processor 66 accesses snapshot 76B, the preceding source snapshot comprises snapshot 76A. Likewise, when processor 66 accesses snapshot 76C, the preceding source snapshot comprises snapshot 76B.

In a third identification step 166, processor 66 identifies a "diff set" of storage regions 60 that are used to store the accessed snapshot that were not used by the preceding source snapshot. For example, if the accessed source snapshot comprises snapshot 76B comprising a first set of storage regions 60 and the preceding snapshot comprises snapshot 76A comprising a second set of the storage regions, the diff set comprises a set difference of the second set and the first set. In set theory, given sets U and A, a set difference of U and A, denoted U\A, comprises the set of all members of U that are not members of A.

In a second store step 168, processor 66 stores, to the target volume, metadata 78 comprising storage region identifiers 82 that indicate identifiers 62 of the diff set identified in step 166. As described supra the metadata may comprise identifiers 62 of the respective storage regions that are referenced in a current state of the source volume or any subsequent source snapshots 76.

In a third create step 169, processor 66 creates an additional target snapshot 76 in storage pool 64B. Upon completing step 169, the accessed source snapshot has a first instance in storage pool 64A and a second instance in storage pool 64B. As described supra, the metadata may include additional information such as a lock status and a creation date for data volume 74A.

In a comparison step 170, if there are additional source snapshots 76 that were identified in step 156, then the method continues with step 162. However, if there not additional snapshots 76 that were identified in step 156, then in a fourth identify step 171, processor 66 identifies one or more additional source storage regions 60 in storage pool 64A that were not used by a most recent one of the identified source snapshots (snapshot 76C in the example shown in FIG. 2). In a third store step 172, processor 66 stores, to volume 74B, metadata 78 indicating the one or more additional source storage regions identified in step 171.

In other words, in step 171, processor 66 identifies one or more given storage regions 60 included in data volume 74A and not included in source snapshots 76, and in step 172 the module processor stores the respective identifiers of the one or more given source storage regions to storage pool 64B, thereby defining an instance of the given storage regions in the second storage pool.

Upon completing steps 154-172, processor 66 has defined an additional instance of data volume 74A in storage pool 64B. In other words, the same instance of data volume 74 is defined in both storage pools 64A and 64B.

Figure 5B:
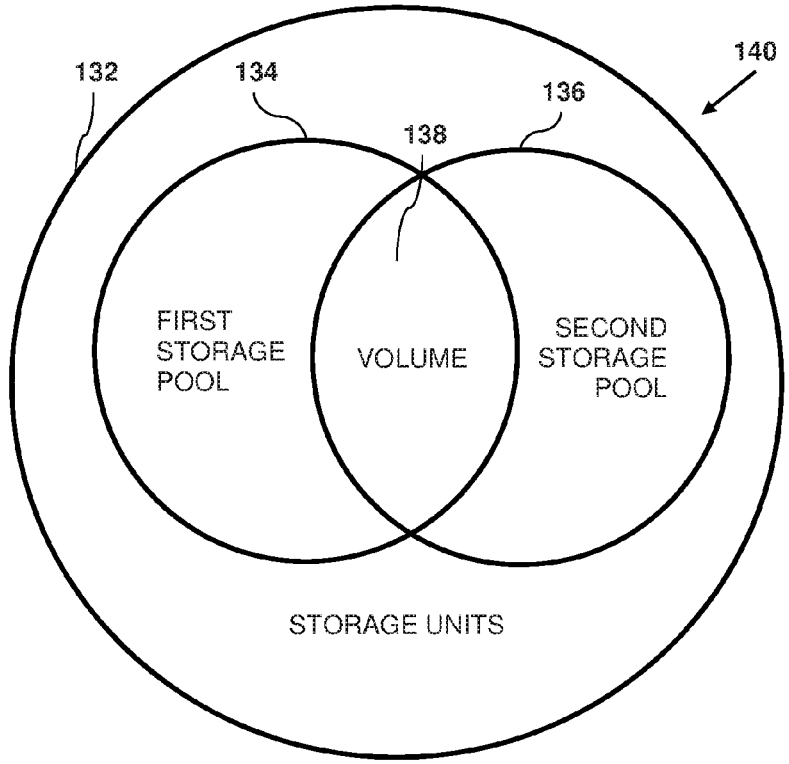

FIG. 5B shows a Venn diagram 140 that shows subset 138 comprising an intersection of subsets 134 and 136. In other words, storage pools 64A and 64B share the storage regions used to store data volume 74.

Figure 5C:
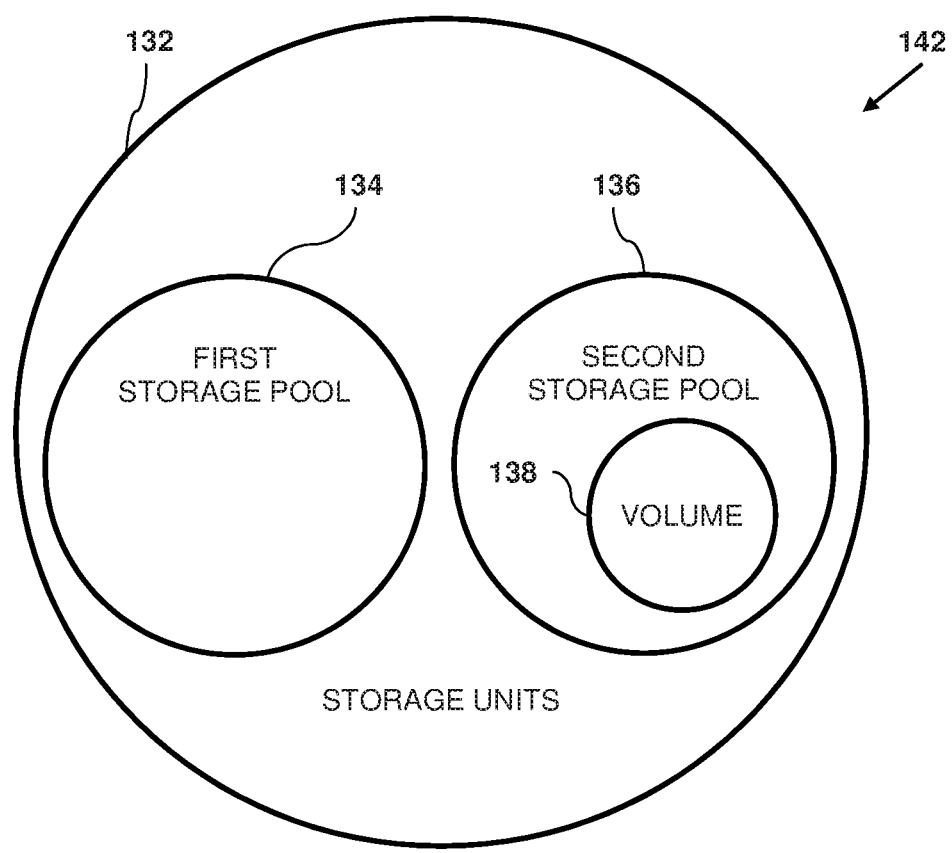

Finally, in a delete step 174, processor 66 deletes metadata 78 defining snapshots 76 of data volume 74A from storage pool 64A, and the method ends. At this point, data volume 74 is defined solely in storage pool 64B. FIG. 5C shows a Venn diagram 142 that shows subset 138 comprising a subset of subset 136. In other words, only storage pool 64B stores the storage regions used to store data volume 74.

In some embodiments, upon completing the steps in the flow diagram, processor 66 can allocate, from storage pool 64B, additional storage regions 60 to target data volume 74B. In operation, processor 66 can use the additional allocated storage regions to store additional data to target data volume 74B. Additionally or alternatively, processor 66 can use the additional allocated storage regions to create an additional snapshot 76 for target data volume 74B.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
defining a source data volume comprising a first multiple of source snapshots;
storing the first multiple of the source snapshots in a first storage pool comprising a second multiple of storage regions having respective identifiers;
receiving a request to copy the source data volume to a target data volume in a second storage pool;
accessing a first given source snapshot comprising a first set of the storage regions;
identifying, by a module processor, a second given source snapshot preceding the first given source snapshot, the second given source snapshot comprising a second set of the storage regions;
identifying a set difference of the second set and the first set of the storage regions; and
storing respective identifiers of the set difference to the target volume.

2. The method according to claim 1, and comprising creating a target snapshot for the target data volume in the second storage pool; and
prior to selecting the first given source snapshot:
identifying a least recent of the first multiple of the source snapshots comprising an initial set of the storage regions,
storing the respective identifiers of the initial set of the storage regions to the target volume, and
creating a first target snapshot in the second storage pool.

3. The method according to claim 2, and comprising deleting, from the first storage pool, metadata defining the first multiple of the source snapshots upon defining the instance of the data volume in the second storage pool.

4. The method according to claim 1, and comprising identifying one or more given storage regions included in the data volume and not included in a most recent one of the source snapshots, and
storing the respective identifiers of the one or more given storage region to the second storage pool.

5. The method according to claim 1, and comprising allocating, from the second storage pool, one or more additional storage regions to the target data volume upon defining the instance of the source data volume in the second storage pool.

6. The method according to claim 1, and comprising:
executing, by a host processor, a hypervisor,
defining, by the hypervisor, a first virtual machine and a second virtual machine,
assigning the first storage pool to the first virtual machine, and
assigning the second storage pool to the second virtual machine.

7. The method according to claim 1, wherein the first storage pool is identical to the second storage pool.

8. A storage system, comprising:
a storage device comprising a first multiple of storage regions having respective identifiers; and
a module processor configured:
to define a source data volume comprising a second multiple of source snapshots,
to store the second multiple of the source snapshots in a first storage pool comprising a third multiple of the storage regions,
to receive a request to copy the source data volume to a target data volume in a second storage pool,
to access a first given source snapshot comprising a first set of the storage regions,
to identify a second given source snapshot preceding the first given source snapshot, the second given source snapshot comprising a second set of the storage regions,
to identify a set difference of the second set and the first set of the storage regions, and
to store the respective identifiers of the set difference to the target volume.

9. The storage system according to claim 8, wherein the processor is configured to create a target snapshot for the target data volume in the second storage pool; and
prior to selecting the first given source snapshot, the processor is configured:
to identify a least recent of the first multiple of the source snapshots comprising an initial set of the storage regions,
to store the respective identifiers of the initial set of the storage regions to the target volume, and
to create a first target snapshot in the second storage pool.

10. The storage system according to claim 9, wherein the processor is configured to delete, from the first storage pool, metadata defining the first multiple of the source snapshots upon defining the instance of the data volume in the second storage pool.

11. The storage system according to claim 8, wherein the module processor is configured:
to identify one or more given storage regions included in the data volume and not included in a most recent one of the source snapshots, and
to store the respective identifiers of the one or more given storage region to the second storage pool.

12. The storage system according to claim 8, wherein the processor is configured to allocate, from the second storage pool, one or more additional storage regions to the target data volume upon defining the instance of the source data volume in the second storage pool.

13. The storage system according to claim 8, and comprising a host processor configured:
to execute a hypervisor, and
to define, using the hypervisor, a first virtual machine and a second virtual machine,
and wherein the module processor is configured:
to assign the first storage pool to the first virtual machine, and
to assign the second storage pool to the second virtual machine.

14. The storage system according to claim 8, wherein the first storage pool is identical to the second storage pool.

15. A computer program product, the computer program product comprising:
a non-transitory computer readable storage medium having computer readable program code embodied therewith, the computer readable program code comprising:
computer readable program code configured to define a source data volume comprising a first multiple of source snapshots;

computer readable program code configured to store the first multiple of the source snapshots in a first storage pool comprising a second multiple of storage regions having respective identifiers;

computer readable program code configured to receive a request to copy the source data volume to a target data volume in a second storage pool;

computer readable program code configured to access a first given source snapshot comprising a first set of the storage regions;

computer readable program code configured to identify a second given source snapshot preceding the first given source snapshot, the second given source snapshot comprising a second set of the storage regions;

computer readable program code configured to identify a set difference of the second set and the first set of the storage regions;

computer readable program code configured to store the respective identifiers of the set difference to the target volume; and computer readable program code configured to create a target snapshot for the target data volume in the second storage pool.

16. The computer program product according to claim 15, and comprising computer readable program code configured to create a target snapshot for the target data volume in the second storage pool; and computer readable program code configured, prior to selecting the first given source snapshot:
to identify a least recent of the first multiple of the source snapshots comprising an initial set of the storage regions,
to store the respective identifiers of the initial set of the storage regions to the target volume, and
to create a first target snapshot in the second storage pool.

17. The computer program product according to claim 16, and comprising computer readable program code configured to delete, from the first storage pool, metadata defining the first multiple of the source snapshots upon defining the instance of the data volume in the second storage pool.

18. The computer program product according to claim 15, and comprising
computer readable program code configured to identify one or more given storage regions included in the data volume and not included in a most recent one of the source snapshots, and
computer readable program code configured to store the respective identifiers of the one or more given storage region to the second storage pool.

19. The computer program product according to claim 15, and comprising computer readable program code configured to allocate, from the second storage pool, one or more additional storage regions to the target data volume upon defining the instance of the source data volume in the second storage pool.

20. The computer program product according to claim 15, and comprising computer readable program code configured:
to execute a hypervisor,
to define, by the hypervisor, a first virtual machine and a second virtual machine,
to assign the first storage pool to the first virtual machine, and
to assign the second storage pool to the second virtual machine.

* * * * *